US006482539B1

United States Patent
Van Berkel et al.

(10) Patent No.: US 6,482,539 B1
(45) Date of Patent: Nov. 19, 2002

(54) ELECTROCHEMICAL CELL WITH SINTERED ANODE OF METALLIC PARTICLES AND OXIDES

(75) Inventors: Franciscus Petrus Felix Van Berkel, GH Alkmaar (NL); Gerardus Simon Schipper, VA Warmenhuizen (NL); Jan Peter De Jong, HC Wieringerwerf (NL)

(73) Assignee: Stichting Energieonderzoek Centrum Nederland, Petten (NL)

( * ) Notice: Subject to any disclaimer, the term of this patent is extended or adjusted under 35 U.S.C. 154(b) by 0 days.

(21) Appl. No.: 09/674,774

(22) PCT Filed: May 4, 1999

(86) PCT No.: PCT/NL99/00269

§ 371 (c)(1),
(2), (4) Date: Nov. 6, 2000

(87) PCT Pub. No.: WO99/57779

PCT Pub. Date: Nov. 11, 1999

(30) Foreign Application Priority Data

May 4, 1998 (NL) ................................. 1009060

(51) Int. Cl.$^7$ ............................. H01M 8/10; H01M 4/02
(52) U.S. Cl. ................................. 429/30; 429/209
(58) Field of Search ............................. 429/218.1, 235, 429/237, 244, 236, 30, 209

(56) References Cited

FOREIGN PATENT DOCUMENTS

| DE | 39 22 673 A1 | 1/1991 |
|---|---|---|
| EP | 0 426 265 A3 | 5/1991 |
| EP | 0 426 265 A2 | 5/1991 |
| EP | 10021929 | 1/1998 |
| EP | 10021930 | 1/1998 |
| EP | 10021931 | 1/1998 |
| JP | 960167506 | 6/1996 |
| JP | 960169531 | 6/1996 |
| WO | WO 94/13027 | 6/1994 |

OTHER PUBLICATIONS

J. Electrochem. Soc., XP–002091018, "*Configurational and Electrical Behavior of Ni–YSZ Cermet Withnovel Microstructure for Solid Oxide Fuel Cell Anodes*", Hibiki Itoh et al., vol. 144, Feb. 1997, pp. 641–646.

Journal of Power Source, "*Performance of a Solid Oxide Fuel Cell Fabricated by Co–Firing*", Himeko Ohrui et al., 1998, pp. 185–189.

*Primary Examiner*—Patrick Ryan
*Assistant Examiner*—M. Wills
(74) *Attorney, Agent, or Firm*—Young & Thompson

(57) ABSTRACT

An anode for an electrochemical cell having an oxide-to-metal particle size ratio gradient between the current collector side and the electrolyte side of the anode.

13 Claims, 2 Drawing Sheets

ELECTROCHEMICAL CELL WITH SINTERED ANODE OF METALLIC PARTICLES AND OXIDES

Figure 1:
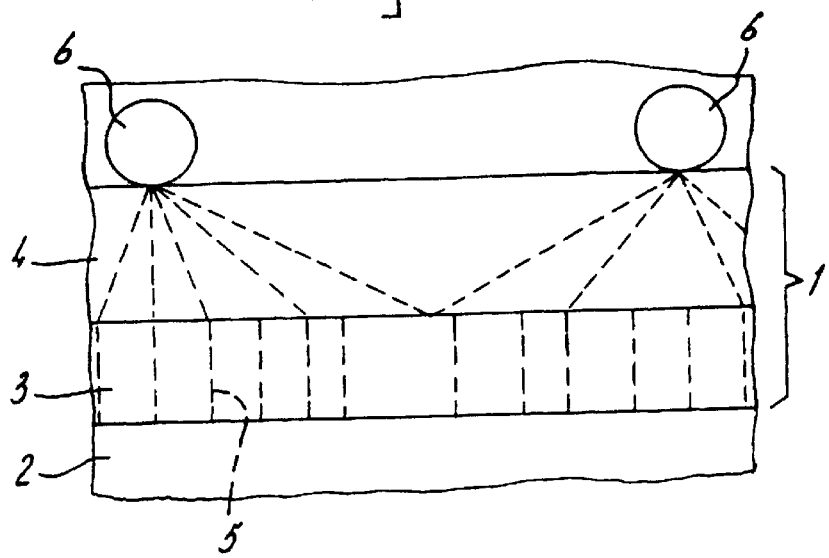

The present invention relates to an electrochemical cell according to the precharacterising clause of Claim 1.

An SOFC cell of this type is disclosed in Japanese Patent publication 10 021931 A. In this publication an anode is shown wherein a first layer consists of metallic particles on which very fine oxide particles have been deposited. The second layer, which is located further away from the electrolyte, consists of a mixture of metallic particles and coarser ceramic particles. These ceramic particles are smaller than the metallic particles. In International Application PCT/NL 93/00256 in the name of Stichting Energieonderzoek Centrum Nederland (ECN) it is described that for SOFC cells it is desirable to have an anode layer with which both the electrochemical activity and the conduction of electrons are optimised. The electrochemical activity is, in particular, determined in the part that is directly in contact with the electrolyte, whilst it is obvious that conduction of electrons is essential for functioning of the cell. Ultimately, these electrons move towards the current collector of the anode. To provide these characteristics it is proposed to make up the anode from a mixture which after sintering and reduction consists of relatively small metallic particles for conduction of electrons and the electrocatalytic activity and oxides for mechanical stabilisation of the anode and matching of the coefficient of thermal expansion to the electrolyte. Close to the interface with the electrolyte, the metallic particles act as a catalyst to promote the electrochemical reaction. According to the abovementioned European application, the particle size of the various components is so chosen that after sintering the metal particles are smaller than the oxide particles in order thus to ensure adequate conduction of electrons.

It has been indicated above that the various particles have different functions depending on the position in the anode. If, for example, nickel is used as the metal for the particles, this has mainly an electrocatalytic function close to the interface with the electrolyte, whilst closer to the current collector the conduction of electrons becomes more important. The same applies for the oxides. The latter must display oxygen ion conduction, in particular close to the interface with the electrolyte, whilst closer to the current collector it is important that there are adequate possibilities for the metal mixed with the oxide particles to be able to provide current-conducting paths. The construction according to Japanese Patent 10 021931 mentioned above meets these requirements only partially. Close to the current collector the network is relatively weak because of the relatively small oxide particles compared with the metal particles. As a result it is not possible to guarantee metallic contact between the metal particles in the longer term and electron conductivity will become inadequate in the long term.

The aim of the present application is to provide an anode for an electrochemical cell, and more particularly an SOFC cell, with which the requirements imposed depending on the position in the layer can be met.

This aim is achieved with an SOFC cell as described above having the characterising measures of Claim 1. Because the oxide particles close to the current collector are larger than the metal particles, an optimum metal network is provided. As a result optimum conduction of electrons can be guaranteed even in the long term. According to the invention, an electrochemical cell which has high stability as a result of a stable metal network is obtained.

According to an advantageous embodiment of the invention, the average particle size of the oxides is <1 $\mu$m close to the electrolyte and >2 $\mu$m close to the current collector.

In this context the average diameter of the metallic particles and in particular of nickel is in particular between 1 and 2 $\mu$m.

According to the invention small oxygen-ion-conducting oxide particles are used close to the electrolyte. Examples thereof are ion-conducting oxides of the crystal structure class of fluorites or perovskites, and in the case of fluorites zirconia, cerium and hafnia doped with trivalent rare earth metal ions or divalent alkaline earth metal ions and, in the case of perovskites, ion-conducting zirconates, cerates and gallates. Closer to the current collector clear paths along which the electrons move will be produced because of the discrete distance between the various grid components of said current collector. The most important function of that part of the anode that faces away from the electrolyte and is in contact with the current collector is that of a current-collecting layer and, according to the invention, this part is formed by a cermet of coarse oxide particles (alumina, YSZ, GCO, perovskites) and small electron-conducting metal particles. As a result of the relatively coarse oxide particles, nickel paths are produced when nickel is used. It will be understood that other metals known from the prior art, such as copper, other semi-noble metals and noble metals, can be used instead of nickel.

The range of the coarse oxide particles, that is to say the oxide particles which are closest to the current collector, is preferably between 2 and 15 $\mu$m. That of the fine oxide particles, that is to say the particles which provide for (oxygen) ion conduction, is preferably between 10 nm and 1 $\mu$m.

Such an anode can be produced in any conceivable manner. A particularly simple method is to build it up layer by layer. With this method a first layer is provided which contains the relatively fine oxide particles and is intended subsequently to be placed in contact with the electrolyte, and a second layer is provided which contains the relatively coarse oxide particles. Such a double-layer anode can be produced by any method known from the prior art. Tape casting is a generally known technique for the production of anodes and can be used particularly advantageously for such double-layer anodes. Another technique is screen printing. Optionally the electrolyte is produced at the same time with the aid of these techniques. With such a method in general the metal or metal mixture will be present in the form of metal oxides and when the SOFC cell is started up the metal oxides will be converted to metals at 600–1000° C.

It has been found that, compared with conventional anodes, an anode built up in this way has improved characteristics, measured as electrochemical performance, durability and, when used as a reformer, for example when natural gas is used, the methane-water vapour reform rate, that is to say the conversion to hydrogen, is increased.

It must be understood that the coarse and fine oxide particles can be either the same or different. After all, no or less stringent requirements with regard to the oxygen-ion-conducting character thereof are imposed on the coarse oxide particles close to the current collector. The main important aspect is that said coarse oxide particles in combination with the metal particles found in this part of the anode are capable of providing electron-conducting paths. As a result it is possible to use relatively inexpensive material, such as alumina, for the coarse oxide particles. In principle the same applies in respect of the metals used when the anode is built up of various layers.

Figure 2:
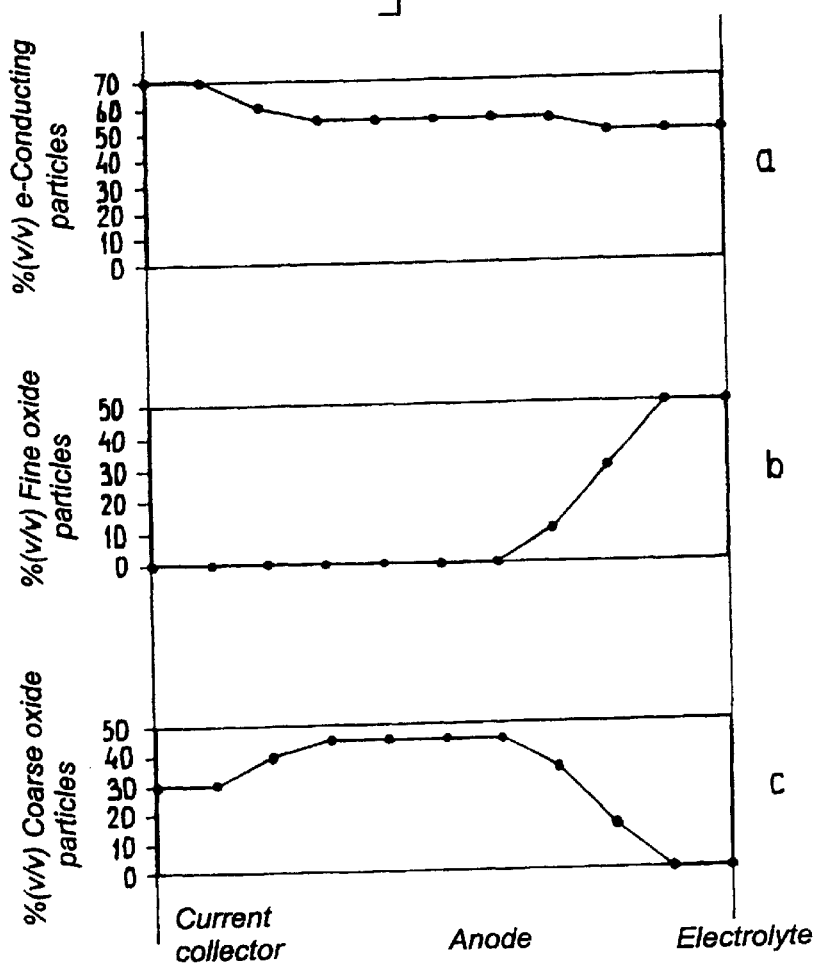
Figure 3:
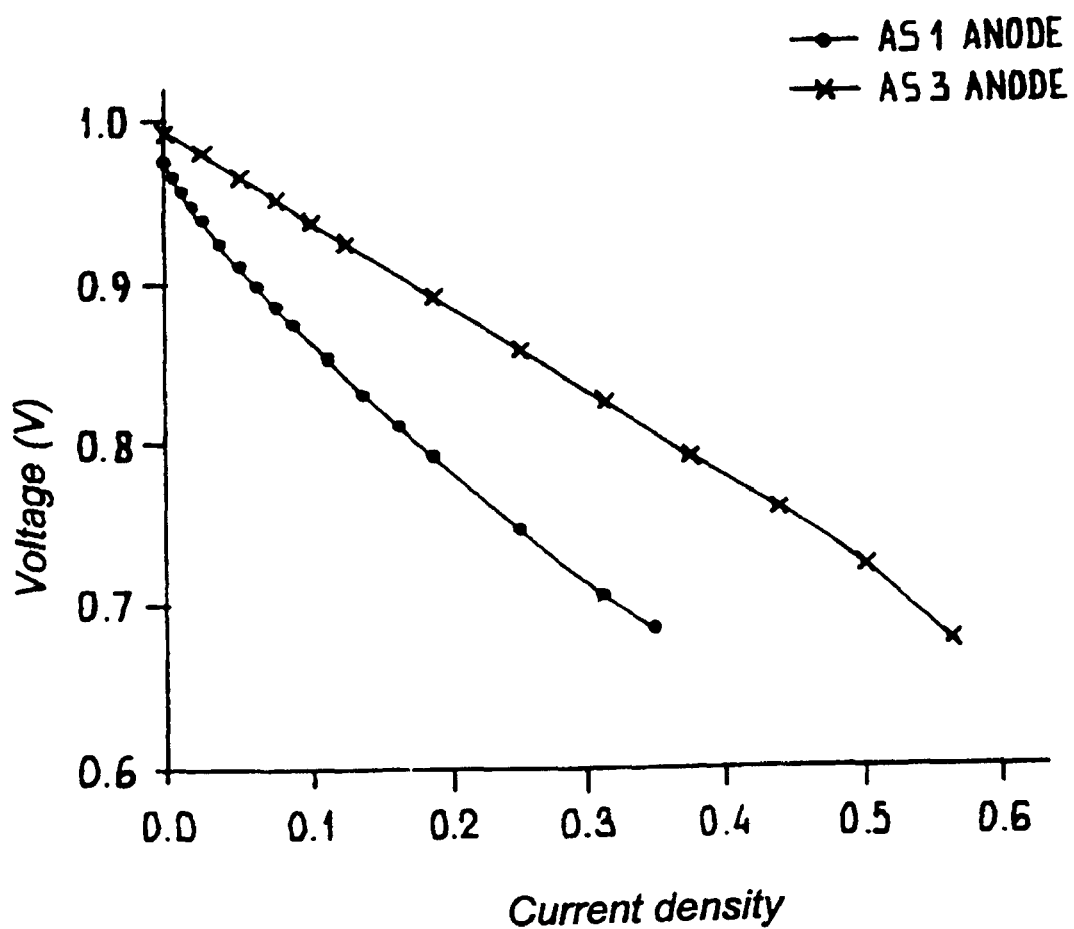

The invention will be explained in more detail below with reference to an illustrative embodiment shown in the drawing. In the drawing:

FIG. 1 shows, diagrammatically in cross-section, part of an SOFC fuel cell provided with the anode according to the invention;

FIGS. 2a–c show plots in which the fraction of the various particles is shown as a function of the position in the anode, as well as certain characteristics thereof; and FIG. 3 shows a plot in which the yield of an SOFC cell according to the invention is compared with a conventional SOFC cell.

In FIG. 1 the anode according to the invention is indicated in its entirety by 1. The anode is in contact on one side with an electrolyte layer 2, which is not shown in more detail, of an SOFC cell and, on the other side, with a current collector consisting of grid wires 6. Because fuel cells are generally known in the prior art, the cathode and the current collector placed against the latter and the other components from which the cell has been made up are not shown.

As can be seen from FIG. 1, the anode is made up of two layers, a first layer 3 and a second layer 4.

In the operating condition, in the example shown the first layer 3 consists of a mixture of electron-conducting particles and (oxygen-)ion-conducting particles. The electron-conducting particles, that is to say nickel, also act as catalyst close to the interface with the electrolyte 2. The second layer 4 likewise consists of electron-conducting nickel particles as well as of relatively coarse oxides, in this case YZS. The various dimensions will be explained below with reference to an illustrative embodiment. The movement of the electrons is shown highly diagrammatically by broken lines 5. Fairly uniform distribution of the electron movement from electrolyte to current collector 6 takes place in the first layer 3. However, a concentration takes place in the second layer 4 of the anode. Ultimately the electrons collect at the grid wires 6.

This means that more stringent demands in respect of the conduction of electrons are imposed on the second layer 4 than on the first layer 3. These demands are met by allowing the YZS particles to be relatively coarse, so that nickel paths are produced along which the electrons are easily able to move. These fine oxides are needed to optimise oxygen ion conduction. The way in which the anode shown with reference to FIG. 1 has been produced will be described below with the aid of an example.

EXAMPLE

An anode as described above has been produced by applying a layer of $Ni/Ce_{0.9}Gd_{0.1}O_{1.95}$(10GCO) on a YSZ electrolyte by means of tape casting, screen printing or other deposition techniques, starting from NiO and 10GCO powders. This layer can have a thickness of 1–50 $\mu$m. The 10GCO particles have the same particle size as, or even a smaller particle size than, the Ni particles ($\approx$1 $\mu$m) after reduction of the anode, resulting in a continuous network of GCO particles and of Ni particles, which are of importance for good oxygen ion conduction and, respectively, electron conduction in this layer.

By means of the abovementioned deposition techniques, a layer of Ni/YSZ cermet (thickness 10–500 $\mu$m) has been applied on top of said layer, the YSZ particles being larger than the Ni particles (>1–2 $\mu$m) after reduction of the anode. This is necessary in order to produce an Ni network having good percolation for the electron conduction. This anode is sintered in its entirety at 1100–1300° C.

The make-up of an anode produced in this way is shown in a plot in FIG. 2. In this plot the "thickness" of the anode is shown horizontally, that is to say the current collector is on the left and the electrolyte on the right. FIG. 2a shows the percent by volume of metallic particles, FIG. 2b the percent by volume of fine oxides and FIG. 2c the percent by volume of coarse oxides. As a result of the measures described above it is found that a high percent by volume of fine oxide particles and a low percent by volume of coarse particles is present close to the electrolyte-anode interface, whilst this is precisely the reverse at the anode-current collector interface. It must be understood that average particle size has been assumed above.

In FIG. 3 the performance of an electrochemical cell according to the invention has been compared with that of a standard cell. The operating conditions were 850° C. with methane as fuel and air as oxidant. The cell according to the invention is indicated by AS3, whilst the cell according to the prior art, that is to say produced in accordance with the method described in the abovementioned International Patent Application PCT/NL 93/00256, has been indicated by AS1. It can clearly be seen from FIG. 3 that for a given voltage the current density of the cell according to the invention increases appreciably.

It will be understood that only an example of the present invention has been given in the above. It is possible to produce the anode in such a way that a continuous progression from coarse to fine particles takes place. It is also possible to produce the anode from a larger number of layers than two layers if the various operations take place stepwise. It is also possible to use any material known from the prior art both for the metallic particles and for the oxide particles. In the extreme case it is even possible to introduce exclusively metallic particles and optionally 'oxide dispersion strengthener' metal, for example based on aluminium, into the anode close to the current collector. These and similar modifications fall within the scope of the present application as defined in the appended Claims.

What is claimed is:

1. Electrochemical cell, comprising an anode, electrolyte and cathode as well as current collectors in contact with the anode and cathode, wherein said anode comprises a mixture of metallic particles and oxides, wherein the average particle size of the oxides, being oxygen conductors close to the electrolyte, is smaller than the particle size of the oxides close to the current collector, wherein the average particle size of the oxides close to the electrolyte is smaller than or equal to the average particle size of metal particles present in this location, the average particle size of the oxides close to the current collector being greater than that of the metal particles present at this location.

2. Electrochemical cell according to claim 1, wherein the average particle size of the oxides is >2 $\mu$m close to the current collector.

3. Electrochemical cell according to claim 1, wherein the average particle size of the oxides close to the electrolyte is in the range 10 nm–1 $\mu$m.

4. Electrochemical cell according to claim 1, wherein the average particle size of the oxides close to the current collector is in the range of 2–15 $\mu$m.

5. Electrochemical cell according to claim 1, wherein the average diameter of the metallic particles, is between 1 and 2 $\mu$m.

6. Electrochemical cell according to claim 1, wherein said anode comprises at least two layers, a first layer in contact with the electrolyte and a second layer in contact with said current collector.

7. Electrochemical cell according to claim 6, wherein the metallic particles in said first layer comprise nickel, copper or noble metal particle and the oxides comprise ion-conducting oxides from the crystal structure class of fluorites or perovskites and, in the case of fluorites, zirconia, cerium and hafnia doped with trivalent rare earth metal ions or divalent alkaline earth metal ions and, in the case of perovskites, ion-conducting zirconates, cerates and gallates.

8. Electrochemical cell according to claim 6, wherein said second layer comprises a cermet of alumina, yttrium or other rare earth metal ions or alkaline earth metal ions, stabilized zirconia and/or perovskites and electron-conducting metal particles.

9. Electrochemical cell according to claim 1, comprising an SOFC cell.

10. Method for the production of an electrochemical cell, which cell, comprises an anode, electrolyte and cathode as well as current collectors in contact with the anode and cathode, wherein the anode is produced by providing, by means of tape casting, screen printing, spray casting or sludge casting and/or sol/gel technology, a first green layer comprising metal oxides and oxygen-ion-conducting oxides, wherein said oxygen-ion-conducting oxides have an average particle size of <1 $\mu$m, providing, by means of tape casting, screen printing, sludge casting or spray casting, a second layer comprising metal oxides and also ceramic oxide particles having an average particle size of >2 $\mu$m, followed by sintering said layer assembly formed in this way, after which said metal oxides are converted to metals, wherein assembly of the fuel cell is effected such that said second layer is nearer to the current collector than said first layer which is nearer to the electrolyte.

11. Method according to claim 10, wherein said first layer is applied on a green electrolyte layer.

12. Method according to claim 10, wherein said size of the metal oxide particles of the second layer is so chosen that, after reduction thereof, the resulting metal particles of the second layer are larger than the metal particles of the first layer.

13. Method according to claim 10, wherein the size of the metal oxide particles in said second layer is so chosen that, after reduction, the ceramic particles have an average particle size greater than that of the metal particle produced.

* * * * *